United States Patent Office 3,402,948
Patented Sept. 24, 1968

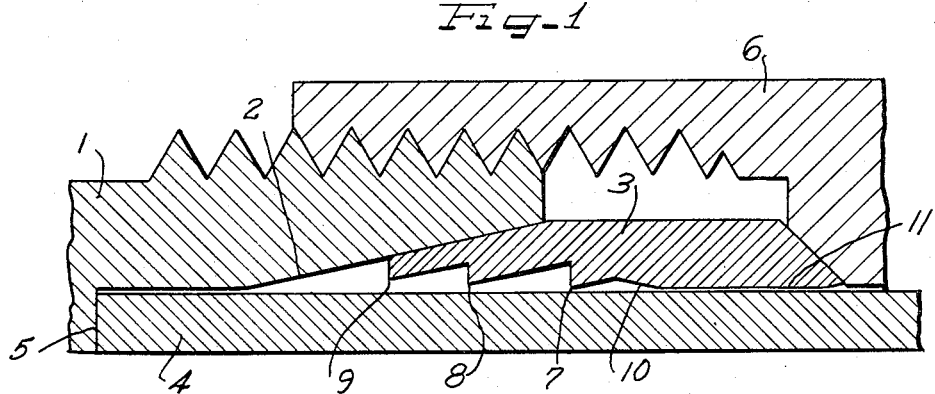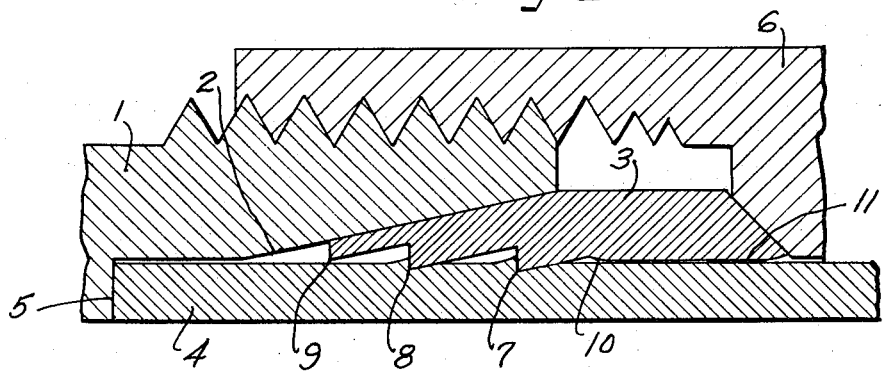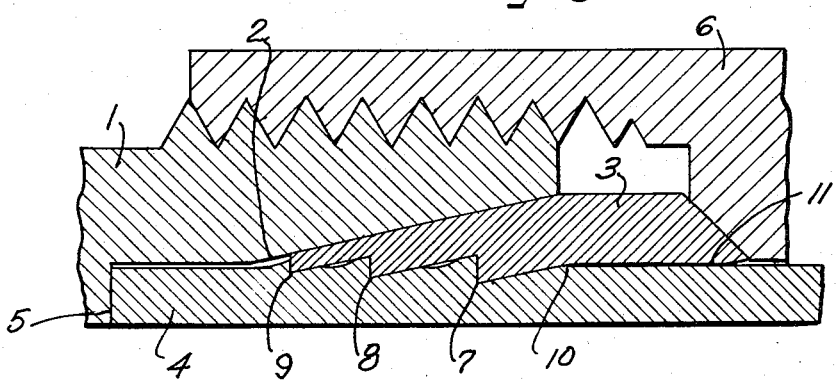

3,402,948
CONICAL SEALING RING HAVING A CIRCULAR EDGE FOR TUBE CONNECTIONS
Hans Kreidel, Sr., and Hans Kreidel, Jr., Wiesbaden, Germany, assignors to Inventex G.m.b.H., Baden, Aargau, Switzerland, a company of Switzerland
Filed May 25, 1966, Ser. No. 552,932
Claims priority, application Germany, May 26, 1965, K 56,227
3 Claims. (Cl. 285—341)

ABSTRACT OF THE DISCLOSURE

A conical sealing sleeve used in a tube connection comprising a connecting nipple and a pressure applying nut. The sleeve has a plurality of circular cutting edges spaced along an inner surface from one of the sleeve. The diameter of the circular edges is progressively decreasing as their distance from the one end increasing. During the connecting operation, the edges cut into the tube successively with decreasing penetration depths beginning with the edge most remote from the one end of the sleeve to provide a firm connection between the tube and the connecting nipple.

---

The invention relates to a conically shaped washer having a sleeve or circular edge, which is inserted into a tube connection, characterized by the feature that the end of the tube to be connected is tightly held in place between a nipple and a pressure applying structure, for example, a sleeve or coupling nut, by means of a a so-called cutting ring. Because of their high pressure cpabilities and their simple assembly without special tools, such tube connections have been introduced and adequately stood the test in all fields of small pipeline construction, engineering and especially in high pressure hydraulics. The distinguishing character of this kind of connection resides in the feature that the cutting ring is forced into an internal conical surface located in the nipple, by means of a sleeve or coupling nut, whereby the front part of the ring, which is provided with a hard cutting edge, is deformed and thereby, while material raises, cuts into the tube end seated in the nipple deforming the material thereof in a sealing manner, thus securing said tube end against withdrawal. The pressure capabilities of this type of connection depend upon the penetration depth into the tube wall and upon the distance of the cutting action from the tube end.

The effort required for the tightening of the coupling nut increases with the penetration depth into the tube and is relatively high, without being unequivocally limited once the required depth is reached. The pressure which the cutting edges exert in radial direction to the tube to be connected is correspondingly high, so that particularly thin-walled and soft tubes may be narrowed or compressed during the assembly. A cut which is too deep may, in certain circumstances, weaken the tube beyond permissible limits.

In order to prevent the narrowing of such tubes and also an excessive penetration depth of the edge, a cutting ring with several successive cutting edges operating simultaneously has been proposed. The radial pressure is thereby distributed over a larger tube length and the penetration depth is appropriately reduced, resulting in an equivalent seal. On the other hand, the required effort for tightening of the coupling nut increases approximately coresponding to the number of edges.

In addition, a further step for development of an effective limitation of the penetration depth through sensible increasing of the required effort has been achieved by utilization of the well known so-called cutting or conical ring for which, adjacent to the front part of the ring which carries the edge, a wedging part is provided, which after desired penetration of the cutting edge into the tube, so fills the ring space between the tube and the inner conical portion of the nipple that a further tightening is possible only with considerably higher effort. In this arrangement, the entire length of the wedging part bears on the tube, for which reason the transition from cutting to wedging takes place gradually, and therefore cannot be sharply marked. The final tightening to obtain the highest pressure seal of this improved construction is still dependent on the manual touch and requires that the assembler, in case of doubt, after dismantling, undertakes a sight examination and makes sure that the tightening is sufficient by checking the resulting elevation on the tube.

It is the purpose of the invention to create a tightening limit for the production of such cutting tube connections that is unequivacally apparent to the assembler, in which the invention is based upon a sealing sleeve, the front or leading part of which is provided with several circular cutting edges on its interior which cut into the tube wall when the sleeve is axially shifted as the connection between the nipple and the pressure applying structure is effected.

The circular edges are so arranged in a step-like formation that as the connection is made they successively cut into the tube wall, one after another and with decreasing penetration depth, starting with the edge located farthest away from the front or leading end of the sleeve. As produced a part of the front end of the sleeve has an outer wall which is tapered, corresponding to the inner surface of the nipple, in a known manner. In many cases, it may be advantageous to shape the outer wall taper of the sleeve slightly steeper in order to increase the effectiveness of the invention.

Suitably, several successive circular edges are provided, approximately of sawtooth cross section, located on the interior of the sleeve, the inner diameters of which progressively decrease starting with the cutting edge at the forward end toward the interior, whereby the rear side of the innermost cutting edges effects a transition into the inner wall of the rear cylindrical portion of the sleeve lightly resting on the tube end.

Summary of the invention

The present invention provides a conical sealing sleeve for use in a tube connection in which the sleeve is inserted between a connecting nipple and a pressure applying nut. The sleeve is provided with a plurality of circular cutting edges spaced along an inner surface of the sleeve from the leading end thereof. The diameter of the cutting edges is progressively decreased as the distance of the cutting edge from the leading end is increased so that when pressure is applied to the sleeve, the edge furthest from the leading end begins penetration and is subsequently followed by the penetration of the remaining edges, with the edge furthest from the leading end making the deepest penetration.

Accordingly, it is an object of the present invention to provide a conical sealing sleeve which exhibits a tightening limit which is apparent to the assembler.

Another object of the present invention is to provide a sealing ring which creates a tight seal between the connecting nipple and the tube without narrowing or compressing the tube during the assembly operation.

A still further object of the present invention is to provide a sealing ring which creates a tight seal between the tube and the connecting nipple without penetrating into the tube beyond a permissible limit.

The drawing illustrates an example of the invention, in connection with which further details and the operation will be explained. In the drawings, in which like or corresponding reference numerals indicate like or corresponding parts:

FIG. 1 is a longitudinal sectional view of a washer provided with three cutting edges, in its produced form and inserted between a nipple and a wrapper unit;

FIG. 2 is a longitudinal sectional view of the same tube connection after completion of approximately one-half of the tightening operation; and FIG. 3 is a longitudinal sectional view of the same tube connection after completion of the tightening operation.

The tube connection comprises the known broad general combination of a nipple having inner conical surface 2 for reception of sealing sleeve or washer 3 which is pushed on the tube 4 to be connected, with the end of such tube seated on a shoulder 5 formed by contouring of the nipple 1, the connection being effected by tightening of the wrapper or sleeve nut 6. According to the invention, sealing sleeve 3 is provided with three successive circular edges 7, 8, 9. In its original form, as shown in FIG. 1, the inner diameter of the principal cutting edge 7 is disposed slightly above the outer periphery of the tube 4. The adjacent cutting edge 8 has a larger diameter than the principal cutting edge 7, while edge 9, in turn, has a larger diameter than edge 8. The cutting depth and distance of the cutting edges from each other determine the resistance to withdrawal of the tube end in the connection and, at the same time, the pressure capability of the connection itself. At the point 10 the back side of the principal cutting edge 7 effects a transition into the inner wall 11 of the cylindrical end portion of the sleeve. This transition is in the form of an annular recess in the sleeve 3 between the internal surface of the tapered leading end portion of the sleeve and the cylindrical surface defined by the inner wall 11 and adjacent to the inner side of the innermost cutting edge 7, which provides a weakening of the sleeve in that area to enable efficient deformation of the sleeve in the area about the cutting edge 7 during axial thrusting of the sleeve into the connecting nipple by the pressure-applying sleeve nut structure 6. The sleeve nut 6 has urged the exterior conical surface of the sleeve 3 into engagement with the conical surface 2 of the nipple 1, and at this time the cutting edges 7, 8 and 9 have not as yet engaged the tube end 4.

FIG. 2 illustrates the tube connection of approximately half-way in the tightening operation by means of actuation of the sleeve nut 6. The elongated conical part of the sleeve 3 has deformed within the inner conical surface 2 of nipple 1, whereby the principal cutting edge 7 has reached approximately half of the intended cutting depth while edge 8 has already started to cut into the tube. Cutting edge 9 remains above tube 4 out of engagement therewith.

In FIG. 3, illustrating the completely tightened state, the elongated conical part of sleeve 3 has deformed still further and is disposed in sealing engagement with the inner conical surface 2 of nipple 1. The principal edge 7 has reached its intended cutting depth and is prevented from penetrating any further by the fact that its opposite end is forced into tube 4 approximately up to transition point 10. Cutting edge 8 and cutting edge 9 have likewise penetrated up to their intended depth into tube 4. The tube end is thus held in position by three edges which have penetrated to different depths.

The connection resulting from this arrangement by by means of several edges penetrating to different depths is much firmer than a connection with only a single edge and at the same time reduces the danger of a narrowing or tapering of the tube end. The smaller effort required in effecting the connection, as well as its reasonably limited tightening, make it possible for even an unskilled laborer to achieve a secure connection, since special assembling controls are superfluous.

Changes may be made within the scope and spirit of the appended claims which define what is believed to be new and desired to have protected by Letters Patent.

We claim:

1. A sealing sleeve for use in a tube connection comprising a connecting nippel having an internal shoulder for receiving an end of a tube and having an elongated conical inner surface for reception of a leading end of the sleeve disposed on said tube between said nipple and a pressure-applying structure;

said sleeve comprising an annular member having a cylindrical internal surface for encircling said tube;
said sleeve having a leading end portion terminating in said leading end;
said leading end portion having a tapering outer surface corresponding to said conical inner surface of said nipple and also having an inner surface with a plurality of circular cutting edges disposed thereon;
said edges being spaced from said leading end and from each other and being arranged in a step-like formation wherein said edges are of progressively smaller diameter from said leading end inwardly;
there being an annular transition recess in said sleeve member between said surfaces and adjacent to the inner side of the innermost of said cutting edges providing a weakening of the sleeve in that area so that when said sleeve member is thrust axially by said pressure-applying structure into said connecting nipple for effecting a connection between said nipple and said tube compression and deformation of said leading end portion within said conical surface results in said edges successively cutting into said tube and with decreasing penetration beginning with said innermost edge as enabled by said annular transition recess.

2. A sealing sleeve according to claim 1,
wherein said tapering outer surface of said leading end portion is steeper than the taper of the conical inner surface of said nipple.

3. A sleeve according to claim 1,
wherein said transition recess provides a portion which by engagement with the tube limits the amount of deformation of the recess-weakened area and serves as a limit upon depth of penetration of said innermost edge.

References Cited

UNITED STATES PATENTS

| | | | |
|---|---|---|---|
| 2,139,413 | 12/1938 | Kreidel | 285—382.7 X |
| 2,693,376 | 11/1954 | Wurzburger | 285—341 |
| 2,693,377 | 11/1954 | Wurzburger | 285—343 |
| 2,695,796 | 11/1954 | Woodling | 285—382.7 X |

FOREIGN PATENTS

| | | |
|---|---|---|
| 883,512 | 3/1943 | France. |
| 834,626 | 3/1952 | Germany. |
| 1,168,715 | 4/1964 | Germany. |

CARL W. TOMLIN, *Primary Examiner.*

T. F. CALLAGHAN, *Assistant Examiner.*